US010476916B2

(12) United States Patent
Aluvala et al.

(10) Patent No.: US 10,476,916 B2
(45) Date of Patent: Nov. 12, 2019

(54) PROVIDING ON-DEMAND VPN CONNECTIVITY ON A PER-APPLICATION BASIS

(71) Applicant: AIRWATCH LLC, Atlanta, GA (US)

(72) Inventors: Suman Aluvala, Bangalore (IN); Craig Farley Newell, Atlanta, GA (US); Naga Sandeep Reddy Kaipu, Atlanta, GA (US); Sulay Shah, Atlanta, GA (US)

(73) Assignee: AIRWATCH LLC, Atlanta, GA (US)

( * ) Notice: Subject to any disclaimer, the term of this patent is extended or adjusted under 35 U.S.C. 154(b) by 122 days.

(21) Appl. No.: 15/046,464

(22) Filed: Feb. 18, 2016

(65) Prior Publication Data

US 2017/0078336 A1 Mar. 16, 2017

(30) Foreign Application Priority Data

Sep. 14, 2015 (IN) .......................... 4883/CHE/2015

(51) Int. Cl.
*G06F 15/16* (2006.01)
*H04L 29/06* (2006.01)
*H04L 12/46* (2006.01)

(52) U.S. Cl.
CPC ...... *H04L 65/1069* (2013.01); *H04L 12/4633* (2013.01); *H04L 12/4641* (2013.01); *H04L 63/0272* (2013.01); *H04L 63/101* (2013.01)

(58) Field of Classification Search
CPC ............. H04L 12/4633; H04L 65/1069; H04L 12/4641; H04L 63/0272; H04L 63/10; H04L 63/101; H04W 76/02; H04W 76/022; H04W 12/06

USPC ............. 709/225, 227, 228, 229; 726/1, 3, 4
See application file for complete search history.

(56) References Cited

U.S. PATENT DOCUMENTS

| 9,608,962 | B1* | 3/2017 | Chang ................. H04L 63/0272 |
| 2002/0122434 | A1* | 9/2002 | Ido ........................ H04L 1/1809 370/501 |
| 2013/0133061 | A1* | 5/2013 | Fainkichen ............... C09J 7/041 726/15 |
| 2013/0247147 | A1* | 9/2013 | Pontillo ................ H04W 12/02 726/3 |
| 2014/0032691 | A1* | 1/2014 | Barton .................... H04L 41/00 709/206 |
| 2014/0096230 | A1* | 4/2014 | Wade .................. H04L 63/0272 726/15 |
| 2014/0122716 | A1* | 5/2014 | Santhiveeran ........ H04L 63/102 709/225 |
| 2014/0237585 | A1* | 8/2014 | Khan ...................... H04L 63/16 726/15 |
| 2014/0337628 | A1* | 11/2014 | Amato .................. H04L 9/0825 713/171 |
| 2017/0085530 | A1* | 3/2017 | Volkov ................ H04L 63/0272 |
| 2018/0302443 | A1* | 10/2018 | Weiss ...................... G06F 21/74 |

* cited by examiner

*Primary Examiner* — Liang Che A Wang
*Assistant Examiner* — Johnny B Aguiar
(74) *Attorney, Agent, or Firm* — Thomas | Horstemeyer, LLP

(57) ABSTRACT

Disclosed are various approaches for providing on-demand virtual private network (VPN) connectivity on a per-application basis. First, an application is determined to have begun execution on a computing device. The application is then identified. A determination that the application is authorized to access a VPN connection is made. Subsequently, the VPN connection is initiated.

20 Claims, 3 Drawing Sheets

PROVIDING ON-DEMAND VPN CONNECTIVITY ON A PER-APPLICATION BASIS

CROSS REFERENCE TO RELATED APPLICATIONS

This application claims priority to, and the benefit of, Indian Provisional Patent Application No. 4883/CHE/2015 entitled "Providing On-Demand VPN Connectivity on a Per-Application Basis," filed on Sep. 14, 2015, in the Indian Patent Office.

BACKGROUND

Enterprises often provide a virtual private network (VPN) gateway or capability for remote devices to access the internal enterprise network across an insecure or untrusted network (e.g. the Internet). The VPN can allow for a remote device to access services and sites normally only available to devices physically connected to the internal enterprise network. The VPN can also allow for the remote device to route its traffic to third-party services and sites through the enterprise network, allowing for requests from the remote device to appear to originate from the enterprise network rather than the remote device.

Remote devices can be configured to connect to the VPN and send all traffic through the VPN. However, some network traffic can be inappropriate to route through the enterprise network. For example, an enterprise might not want streaming media applications to route traffic through the enterprise network over a VPN in order to avoid wasting bandwidth. However, an enterprise might want some network traffic to always be routed through the VPN, such as email traffic, in order to provide increased security for such network traffic.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for providing on-demand virtual private network (VPN) connectivity on a per-application basis. Execution of an approved or "whitelisted" application can be detected. In response, a virtual network interface for use with a VPN can be created. When the application begins to send traffic, the virtual network interface can be created, the VPN connection can be initiated on the virtual network interface, and the traffic can then be forwarded to the VPN server. Once the application ceases to send and receive network traffic, the VPN connection can be closed. In this manner, a VPN connection can be automatically created for an application without a user having to manually create the connection. In some instances, the virtual network interface can also be subsequently destroyed. However, in other instances the virtual network interface can be maintained for use with future VPN connections.

Figure 1:
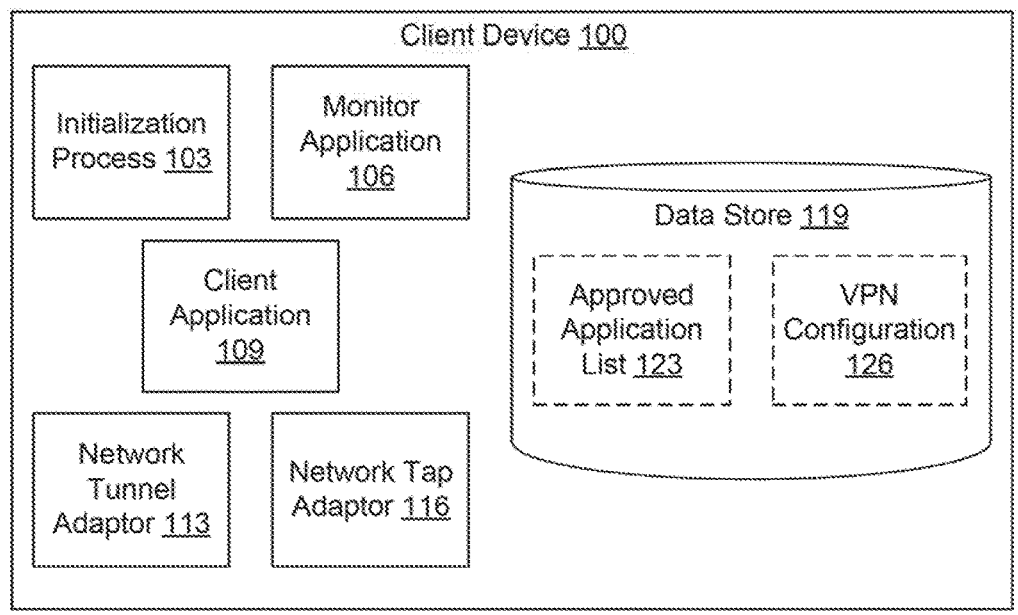
FIG. 1 is a schematic block diagram depicting an example implementation according to various examples of the disclosure.

With reference to FIG. 1, a schematic block diagram of the client device 100 and the various components of the present disclosure are illustrated. The client device 100 can include a processor-based system, such as a computer system. The computer system can be in the form of a desktop computer, a laptop computer, a personal digital assistant, a cellular telephone or smartphone, a web pad, a tablet computer system, or other device with like capability. The client device 100 can include a screen for displaying content. The screen can correspond to a liquid crystal display (LCD), gas plasma-based flat panel display, organic light emitting diode (OLED) display, electrophoretic ink (E ink) display, LCD projector, or other types of display devices. The client device 100 can execute various applications, including the initialization process 103, the monitor application 106, one or more client applications 109, a network tunnel adaptor 113, and a network tap adaptor 116, as well as other applications. The client device 100 can also be configured to store various types of data in a data store 119, which can include various databases, object stores, files, and similar data repositories. For example, the client device 100 can be configured to store an approved application list 123 representing a list of client applications 109 authorized to use a virtual private network (VPN) connection, a VPN configuration 126, and potentially other data in the data store 119.

The initialization process 103 can be one of the first processes started during the booting of the client device 100. For example, the initialization process 103 could be the first process executed by an operating system of the client device 100 after the firmware or basic input/output system (BIOS) of the client device 100 passes control of the client device 100 to the operating system of the client device 100. The initialization process 103 can continue to execute until the client device 100 is shutdown. The initialization process 103 can be the direct or indirect ancestor of all other processes or applications executing on the client device 100. For example, a process or application can be instantiated when the initialization process 103 uses the "fork" system call provided by Unix or Linux operating systems, the "spawn" system call provided by the Windows operating system, or similar system calls provided by other operating systems. In such situations, the initialization process 103 can be considered to be the parent process and the newly instantiated process can be considered to be the child process. Accordingly, the initialization process 103 is the direct ancestor of the newly instantiated process. As another example, a process or application instantiated from the initialization process 103, such as a currently executing client application 109, can itself make use of the fork, spawn, or similar system calls to instantiate additional processes or applications. In such situations, the initialization process 103 can be considered to be the grandparent or indirect ancestor of the newly instantiated process.

The initialization process 103 can be referred to by a number of different names, depending on the particular operating system installed on the client device 100. For example, Unix® operating systems and Linux® operating systems often implement the initialization process 103 as the "Init Process," although the Linux-based Android® operating system implements the initialization process 103 as the "Zygote" process. However, some Linux operating systems use alternative implementations to provide the functionality of the initialization process 103, such as the "Systemd" and "Upstart" frameworks. As another example, older versions of Apple's OS X® also use the InitProcess, although new versions of OS X and iOS® operating systems implement the functionality of the initialization process 103 within the "Launchd" system. In a further example, many Microsoft Windows systems implement the "Service Control Manager" to provide the functionality of an initialization process 103. Although minor differences may exist between specific implementations of the initialization process 103 by various operating systems, the principles of the pending disclosure are equally applicable to any of these implementations and similar implementations in other systems.

The monitor application 106 can be executed to identify when the initialization process 103 instantiates a client application 109. The monitor application 106 can also determine whether the instantiated client application 109 is allowed to access a virtual private network (VPN) connection provided to the client device 100, as further described below. The monitor application 106 can also, in some examples, create a virtual network device for use with the VPN connection and initiate the VPN connection on behalf of the client application 109.

The client application 109 can correspond to any application or service executable by the client device 100. The client application 109 can include, for example, web browsers, email applications, instant messaging applications, chat applications, document management applications, file sharing applications, file synchronization applications, voice-over-internet-protocol (VoIP) applications, social media applications, streaming media (e.g. audio or video) applications, two-factor authentication applications, encryption and decryption applications, address book applications, calendar applications, and potentially other applications.

The network tunnel adaptor 113 can correspond to a virtual network device. The network tunnel adaptor 113 can simulate a hardware network device and can operate on packets at layer 3 of the Open Systems Interconnection (OSI) model (e.g., Internet Protocol version 4 (IPv4) packets, Internet Protocol version 6 (IPv6) packets, Internet Protocol Security (IPsec) packets, or Internet Control Message Protocol (ICMP) packets). Packets sent by an operating system of the client device 100 can be delivered to a client application 109. Similarly, packets sent by the client application 109 to the network tunnel adaptor 113 can be injected by the network tunnel adaptor 113 into the network stack of the operating system for transmission across a network using a physical network adaptor installed on the client device 100. In some instances, multiple network tunnel adaptors 113 can be present on a client device 100.

The network tap adaptor 116 is a virtual network device. The network tap adaptor 116 can simulate a hardware network device and can operate on packets at layer 2 of the OSI model (e.g., Ethernet packets, Address Resolution Protocol (ARP) packets, Neighbor Discovery Protocol (NDP) packets, and Point-to-Point Protocol (PPP) packets). Packets sent by an operating system of the client device 100 can be delivered to a client application 109. Similarly, packets sent by the client application 109 to the network tap adaptor 116 can be injected by the network tap adaptor 116 into the network stack of the operating system for transmission across a network using a physical network adaptor installed on the client device 100. In some instances, multiple network tap adaptors 116 can be present on a client device 100.

The data store 119 can represent one or more databases, data structures, memory addresses, or other approaches for storing data in the memory of the computing device 100. Within the data store 119, an approved application list 123, a VPN configuration 126, and potentially other data can be stored. The approved application list 123 can include a list of client applications 109 authorized to communicate over a VPN using either a network tunnel adaptor 113 or a network tap adaptor 116. The client applications 109 included in the approved application list 123 can be identified by application name, a digital signature of the client application 109, a unique identification number of the client application 109, or with similar approaches. For example, the application name could correspond to the filename of or file path to the binary file of the client application 109 installed on the client device 100. As another example, the digital signature of the client application 109 could correspond to a unique cryptographic signature of the binary file of the client application 109.

The unique cryptographic signature could be generated with a digital certificate of a known application developer or distributor to verify the identity or integrity of the client application 109. The VPN configuration 126 can include a list of settings for a VPN connection to be used by the client device 100 to connect to a corresponding VPN. For example, the VPN configuration 126 can include a username, a password, a digital certificate, an address of a VPN server, a communications protocol (e.g. PPP, IPsec, a secure sockets layer (SSL) or transport layer security (TLS) based VPN protocol, or some other VPN protocol) for the VPN connection. The VPN configuration 126 can also specify whether the VPN connection is to use a network tunnel adaptor 113 or a network tap adaptor 116. In some instances, the VPN configuration 126 can also specify values for various settings of the network tunnel adaptor 113 or network tap adaptor 116. For example, the VPN configuration 126 can specify which Domain Name System (DNS) servers to use with the network tunnel adaptor 113 or the network tap adaptor 116, which IP address or addresses to assign to or associate with the network tunnel adaptor 113 or the network tap adaptor 116, the subnet mask of the network tunnel adaptor 113 or the network tap adaptor 116, the media access control (MAC) address to assign to or associate with the network tunnel adaptor 113 or network tap adaptor 116, and potentially other settings for the network tunnel adaptor 113 or network tap adaptor 116.

In some examples, a separate VPN configuration 126 can be used for each client application 109 included in the approved application list 123. For example, an enterprise may prefer that network traffic sent and received from particular client applications 109 be routed through a particular VPN. As another example, an enterprise may prefer that network traffic sent and received from particular applications 109 be protected using one VPN protocol, while network traffic sent and received from other applications 109 be protected using another VPN protocol, such as a VPN protocol that provides for additional security (e.g. stronger encryption, perfect forward secrecy, or other security features).

Next, a general description of the operation of the various components of the client device 100 is provided. To begin, the monitor application 106 monitors the initialization process 103 to identify when the initialization process 103 instantiates a client application 109. However, in some examples the monitor application 106 can similarly monitor additional processes or applications beyond the initialization process 103. The monitor application 106 can then determine an identity of the newly instantiated client application 109 and determine whether the identity of the newly instantiated client application 109 is listed in the approved application list 123. For example, the monitor application 106 can compare a digital signature of the newly instantiated client application 109 with digital signatures contained in the approved application list 123. As another example, the monitor application 106 can compare the filename of the binary file of the newly instantiated client application 109 with filenames contained in the approved application list 123.

If the client application 109 is included in the approved application list 123, the monitor application 106 can create either a network tunnel adaptor 113 or a network tap adaptor 116 for use by the client application 109 to communicate over a VPN. In some instances, the monitor application 106 can refer to the VPN configuration 126 to determine whether a network tunnel adaptor 113 or a network tap adaptor 116 is to be created. The monitor application 106 can use one or more settings specified in the VPN configuration 126 to configure the network tunnel adaptor 113 or the network tap adaptor 116. For example, the monitor application 106 can use values specified in the VPN configuration 126 to configure the Domain Name System (DNS) servers to be used with the network tunnel adaptor 113 or the network tap adaptor 116, the IP address or addresses to be associated with the network tunnel adaptor 113 or the network tap adaptor 116, the subnet mask of the network tunnel adaptor 113 or the network tap adaptor 116, the media access control (MAC) address to be associated with the network tunnel adaptor 113 or network tap adaptor 116, as well as specify values for other configuration settings.

After creating the appropriate virtual network adaptor, the monitor application 106 polls the client application 109 to identify and capture network traffic generated by the client application 109. After detecting a first network packet generated by the client application 109, the monitor application 106 can initiate, activate, or otherwise enable the VPN on the created virtual network adaptor. The monitor application 106 can then relay the first network packet, as well as subsequent network packets from the client application 109 to the virtual network adaptor. As a result, the client application 109 uses the VPN connection to send traffic through the VPN server. In some instances, the monitor application 106 can also relay network packets or other network traffic received by the virtual network adaptor to the client application 109. Once the monitor application 106 detects that the client application 109 has stopped sending and receiving network traffic, the monitor application 106 closes or disables the VPN connection. In some instances, the monitor application 106 can then destroy the created virtual network adaptor.

Figure 2:
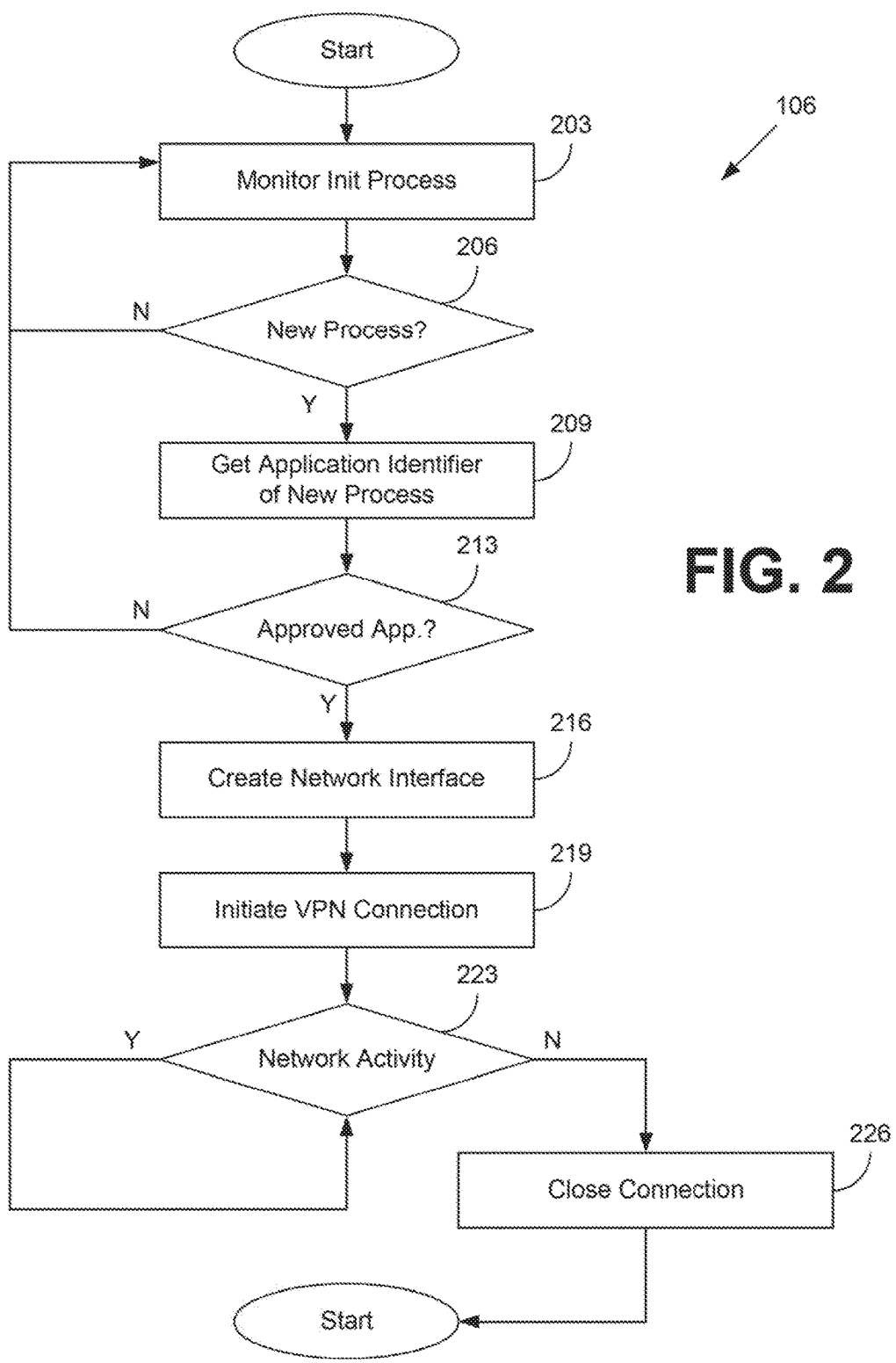
FIG. 2 is a flowchart illustrating one example of functionality according to various examples of the disclosure.

Referring next to FIG. 2, shown is a flowchart that provides one example of the operation of a portion of the monitor application 106. As an alternative, the flowchart of FIG. 2 can be viewed as depicting an example of elements of a method implemented in the client device 100.

Beginning with step 203, the monitor application 106 begins to monitor the initialization process 103 to identify when the initialization process 103 creates a new instance of a client application 109. For example, on a smartphone or tablet running the Android operating system, the monitor application 106 can monitor the Zygote process. To determine when the initialization process 103 creates a new instance of the client application 109, the monitor application 106 can observe the system calls invoked by the initialization process 103, such as a the fork system call on Unix or Linux based systems, the spawn system call on Windows based systems, and similar system calls provided by other operating systems.

Moving on to step 206, the monitor application 106 determines whether or not a new instance of a client application 109 has been created or otherwise instantiated. For example, in the context of the Android operating system, the monitor application 106 can determine whether the Zygote process has invoked the fork system call to clone itself for use as the basis of the new instance of the client application 109. If monitor application 106 determines that the Zygote process has not invoked the fork system call to instantiate a client application 109, then the process loops back to step 203. However, if the monitor application 106 determines that the Zygote process has invoked the fork system call to instantiate a client application 109, then the process proceeds to step 209.

As another example, the monitor application 106 can periodically poll a list of running processes and applications. Such a list can be provided in response to a system call invoked by the monitor application 106 or provided by various programs or utilities executing on the client device 100. For example, Unix and Linux based systems, including OS X and iOS and potentially some implementations of Android, often provide utilities such as "top" or "ps" that implement this functionality. Likewise, Windows based systems often provided the "taskmgr" utility. When the client application 109 appears in the list of currently executing processes and applications, the monitor application 106 can determine that the initialization process 103 has instantiated the client application 109.

Referring next to step 209, the monitor application 106 can identify the newly instantiated client application 109. The monitor application 106 can retrieve the application identifier from the forked client application 109. For example, the monitor application 106 can determine the name of the binary file or the file system path to the binary file corresponding to the newly instantiated client application 109. As another example, the monitor application 109 can determine the digital signature of the newly instantiated client application 109.

Proceeding to step 213, the monitor application 106 can compare the identifier of the client application 109 with the approved application list 123 to determine whether the client application 109 is an approved application. For example, the monitor application 106 can compare the file name or file system path of the newly instantiated client application 109 to a list of file names or file system paths included in the approved application list 123. As another example, the monitor application 106 can compare the digital signature of the newly instantiated client application 109 with a list of digital signatures included in the approved application list 123. If the identifier of the client application 109 is included in the approved application list 123, then the monitor application 106 can determine that the client application 109 is authorized to use a VPN. In this case, the process proceeds to step 216. However, if the identifier of the client application 109 is not included in the approved application list 123, then the monitor application 106 can determine that the client application 109 is unauthorized to use the VPN. In this case, the process proceeds back to step 203.

Moving on to step 216, the monitor application 106 can create a virtual network adaptor or similar virtual network interface for the client application 109 to use for VPN traffic. For example, if the VPN configuration 126 specifies that a network tunnel adaptor 113 is required for the VPN connection, then the monitor application 106 can create a network tunnel adaptor 113. As another example, if the VPN configuration 126 specifies that a network tap adaptor 116 is required for the VPN connection, then the monitor application 106 can create a network tap adaptor 116. The monitor application 106 can also configure the newly created virtual network adaptor as specified by the VPN configuration 126. For example, the monitor application 106 can use values specified in the VPN configuration 126 to configure the Domain Name System (DNS) servers to be used with the network tunnel adaptor 113 or the network tap adaptor 116, the IP address or addresses to be associated with the network tunnel adaptor 113 or the network tap adaptor 116, the subnet mask of the network tunnel adaptor 113 or the network tap adaptor 116, the media access control (MAC) address to be associated with the network tunnel adaptor 113 or network tap adaptor 116, as well as specify values for other configuration settings.

Referring next to step 219, the monitor application 106 initiates the VPN connection using the created adaptor. In some instances, the monitor application 106 can create the VPN connection immediately after creating the virtual network adaptor for use with the VPN connection. In other instances, the monitor application 106 can wait to create the VPN connection until the client application 109 attempts to send its first packet across the network.

Proceeding to step 223, the monitor application 106 monitors the client application 109 for network activity. For example, the monitor application 106 can identify network sockets initialized by the client application 109 and listen for network traffic sent to or received from the network sockets. As another example, the monitor application 106 can configure the client application 109 to use the monitor application 106 as a network proxy service. The monitor application 106 can use any of these or similar approaches to determine whether the client application 109 is sending packets across the network or is receiving packets from the network. As another example, the monitor application 106 can determine that the client application 109 is no longer using the VPN because the client application 109 has failed to send or receive any packets within a determined period of time. The monitor application 106 can use several approaches to determine an appropriate window or period of time to wait before determining that the client application 109 is no longer using the VPN.

For example, the monitor application 106 can use an exponential backoff approach. Network activity can occur in bursts punctuated by periods of no network activity. For example, a client application 109 could send several packets associated with a request for data and then wait until it receives packets in response. The monitor application 109 can determine how long the client application 109 waits to receive the response packets and use this length of time as a baseline. If a response to a later request is received after the baseline period of time, then the longer response is used as a new baseline for determining timeouts. In some instances, a random extra period of time can be added onto the new baseline period of time. If no network traffic is received within the new baseline period of time, then the monitor application can determine that the client application is no longer sending or receiving network traffic.

As another example, the monitor application 106 can determine whether the client application 109 is currently executing (e.g. in the foreground) or is in a suspended state (e.g. in the background). In such instances, the monitor application 106 can determine that current execution of the client application 109 corresponds to network activity or a requirement for the client application 109 to have access to an active VPN connection. Similarly, suspension of execution of the client application 109 can correspond to an indication that the client application 109 does not require access to an active VPN connection or is otherwise not sending or receiving network traffic. In some instances, the monitor application 106 can further determine a change in the execution state of the client application 109 (e.g. foreground to background, or vice-versa), which could correspond to a change in network activity generated by the client application 109.

The process can follow one of several paths depending on whether network activity for the client application 109 has been detected. If the monitor application 106 detects network activity, the process continues to monitor for network activity at step 223. If the monitor application 106 detects that the client application 109 has ceased sending or receiving network traffic, then the process proceeds to step 226.

Moving to step 226, the monitor application 106 closes the VPN connection. For example, the monitor application 106 can cause the client device 100 to disconnect from the VPN server. In some instances, the monitor application 106 can also destroy the virtual network adaptor created previously at step 216. Execution of the process subsequently ends.

Figure 3:
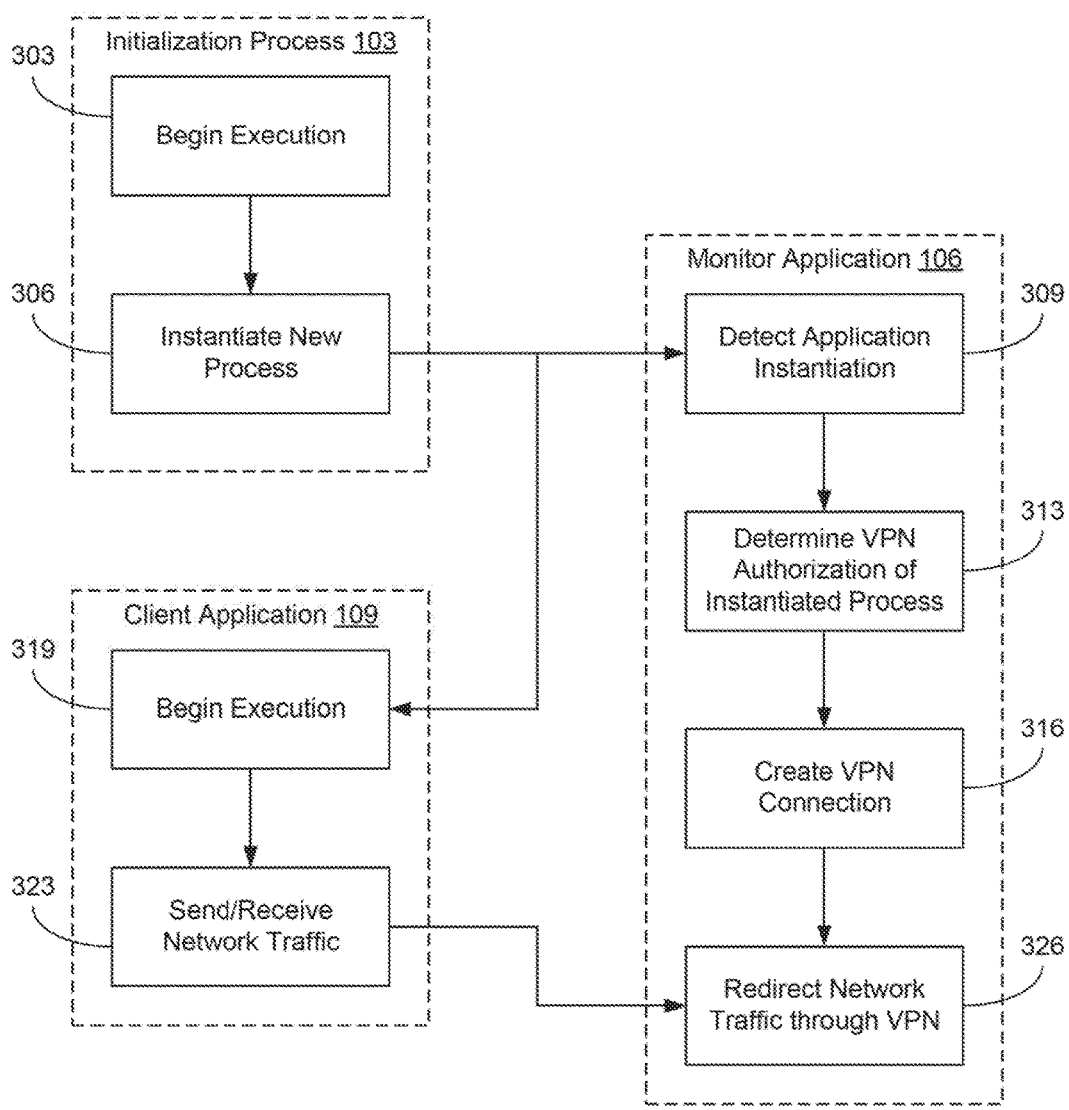
FIG. 3 is a sequence diagram depicting one example of the interactions between several components of an example implementation of the disclosure.

Proceeding to FIG. 3, shown is a sequence diagram that provides one example of the interactions between portions of the initialization process 103, the monitor application 106, and the client application 109. As an alternative, the sequence diagram of FIG. 3 can be viewed as depicting an example of elements of a method implemented in the client device 100.

Beginning with step 303, the initialization process 103 begins execution. This can happen at the beginning of or as part of the boot process of the client device 100, as previously discussed above.

Moving on to step 306, the initialization process 103 instantiates or otherwise initiates execution of the client application 109. This can occur in response to user input (e.g. a user tapping an application icon on a screen of the client device 100, typing an application name at a command prompt, using a mouse or other input device to select an application icon, or similar inputs) or can occur programmatically when one application attempts to execute another application (e.g. a web browser opening a media player to render a video or similar scenario). The initialization process 103 can use a system call, as previously described, to instantiate the client application 109. Subsequent steps 309, 313, and 316 can occur in parallel with subsequent step 319.

Referring next to step 309, the monitor application 106 can detect that the client application 109 has begun execution. For example, the monitor application 106 can detect that the initialization process 103 has invoked a system call using one or more previously described approaches. As another example, the monitor application 106 can find identify the appearance of the client application 109 in a process list, as previously described. Proceeding next to step 313, the monitor application 106 can determine whether the client application 109 is authorized to access a VPN, as previously described. In response to determining that the client application 109 is authorized to access a VPN, at step 316 the monitor application 106 can create or otherwise instantiate a VPN connection as previously described.

Referring next to step 319, the client application 109 begins execution. At step 323, the client application 109 begins to send or receive network traffic. This traffic is redirected through a VPN by the monitor application at step 326 using one or more of the previously described approaches.

The flowchart of FIG. 2 and sequence diagram of FIG. 3 show an example of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function (s).

Although the flowchart of FIG. 2 and sequence diagram of FIG. 3 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 100, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The monitor application 106 and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

We claim the following:

1. A system, comprising:
   a computing device comprising a processor and a memory; and
   a first application comprising machine-readable instructions stored in the memory that, when executed by the processor, cause the computing device to at least:
     monitor an initialization process executing on the computing device;
     determine, based on a fork call from the initialization process, that a second application has begun execution on the computing device, wherein the initialization process creates an instance of the second application based on the fork call;
     identify the second application;
     determine that the second application is authorized to access a virtual private network (VPN) connection;
     create a network adapter on the computing device based on the second application being authorized to access the VPN connection;
     detect a first network packet generated by the second application;
     initiate the VPN connection in response to detection of the first network packet generated by the second application;
     close the VPN connection based on the second application ceasing to transfer packets for a determined period of time; and
     destroy the network adapter on the computing device once the VPN connection is closed.

2. The system of claim 1, wherein the period of time comprises a baseline period of time, the baseline period of time based on a duration between a request for data and a response to the request.

3. The system of claim 1, wherein the second application is authorized to access the VPN connection based on a unique cryptographic signature of a binary file of the second application.

4. The system of claim 1, wherein the first application, when executed, further causes the computing device to at least:
   determine that the second application has begun execution based on an application identifier for the second application being included in an approved application list.

5. The system of claim 1, wherein the period of time comprises a sum of a baseline period of time and a random period of time, wherein the period of time is updated to the sum based on a response being received after the baseline period of time.

6. The system of claim 5, wherein the second application is authorized to access the VPN connection further based on a digital certificate of a developer of the second application.

7. The system of claim 5, wherein the network adapter comprises a network tap adapter.

8. A method, comprising:
monitoring an initialization process executing on a computing device;
determining, based on a fork call from the initialization process, that an application has begun execution on the computing device, wherein the initialization process creates an instance of the application based on the fork call;
identifying the application;
determining that the application is authorized to access a virtual private network (VPN) connection;
creating a network adapter on the computing device based on the application being authorized to access the VPN connection;
detecting a first network packet generated by the application;
initiating the VPN connection in response to detection of the first network packet generated by the application;
closing the VPN connection based on the application ceasing to transfer packets for a determined period of time; and
destroying the network adapter on the computing device once the VPN connection is closed.

9. The method of claim 8, wherein the period of time comprises a baseline period of time, the baseline period of time based on a duration between a request for data and a response to the request.

10. The method of claim 8, the application is authorized to access the VPN connection based on a unique cryptographic signature of a binary file of the application.

11. The method of claim 8, wherein determining that the application is authorized to access the VPN connection further comprises determining that an application identifier for the application is included in an approved application list.

12. The method of claim 8, wherein the application is authorized to access the VPN connection further based on a digital certificate of a developer of the application.

13. The method of claim 12, wherein the network adapter is a network tunnel adapter.

14. The method of claim 12, wherein the network adapter is a network tap adapter.

15. A non-transitory computer-readable medium comprising machine-readable instructions that, when executed by a processor of a computing device, cause the computing device to at least:
monitor an initialization process executing on the computing device;
determine, based on a fork call from the initialization process, that an application has begun execution on a computing device, wherein the initialization process creates an instance of the application based on the fork call;
identify the application;
determine that the application is authorized to access a virtual private network (VPN) connection;
create a network adapter on the computing device based on the application being authorized to access the VPN connection;
detect a first network packet generated by the application;
initiate the VPN connection in response to detection of the first network packet generated by the application;
close the VPN connection based on the application ceasing to transfer packets for a determined period of time; and
destroy the network adapter on the computing device once the VPN connection is closed.

16. The non-transitory computer-readable medium of claim 15, wherein the period of time comprises a baseline period of time, the baseline period of time based on a duration between a request for data and a response to the request.

17. The non-transitory computer-readable medium of claim 15, wherein the application is authorized to access the VPN connection further based on a digital certificate of a developer of the application.

18. The non-transitory computer-readable medium of claim 15, wherein causing the computing device to determine that the application is authorized to access the VPN connection further comprises causing the computing device to at least determine that an application identifier for the application is included in an approved application list.

19. The non-transitory computer-readable medium of claim 15, wherein the network adapter is a network tunnel adapter.

20. The non-transitory computer-readable medium of claim 15, wherein the application is authorized to access the VPN connection based on a unique cryptographic signature of a binary file of the application.

* * * * *